(12) United States Patent
Glick et al.

(10) Patent No.: US 8,904,538 B1
(45) Date of Patent: Dec. 2, 2014

(54) SYSTEMS AND METHODS FOR USER-DIRECTED MALWARE REMEDIATION

(75) Inventors: Adam Glick, Culver City, CA (US);
Spencer Smith, El Segundo, CA (US);
Nicholas Graf, Playa Del Rey, CA (US)

(73) Assignee: Symantec Corporation, Mountain View, CA (US)

( * ) Notice: Subject to any disclaimer, the term of this patent is extended or adjusted under 35 U.S.C. 154(b) by 89 days.

(21) Appl. No.: 13/419,360

(22) Filed: Mar. 13, 2012

(51) Int. Cl.
*G06F 21/00* (2013.01)
*G06F 21/56* (2013.01)

(52) U.S. Cl.
CPC .............. *G06F 21/56* (2013.01); *G06F 21/567* (2013.01)
USPC ........................................................ 726/24

(58) Field of Classification Search
None
See application file for complete search history.

(56) References Cited

U.S. PATENT DOCUMENTS

| | | | |
|---|---|---|---|
| 2006/0101514 A1* | 5/2006 | Milener et al. | 726/22 |
| 2007/0074289 A1* | 3/2007 | Maddaloni | 726/23 |
| 2008/0178286 A1* | 7/2008 | Deyo | 726/22 |
| 2010/0077481 A1* | 3/2010 | Polyakov et al. | 726/24 |
| 2011/0035802 A1* | 2/2011 | Arajujo et al. | 726/23 |
| 2011/0246936 A1* | 10/2011 | Stahlberg | 715/809 |

OTHER PUBLICATIONS

Balduzzi, Marco et al. A Solution for the Automated Detection of Clickjacking Attacks. ASIACCS '10 [online] New York, NY ACM Apr. 16, 2010 [retrieved on Mar. 25, 2013]. Retrieved from the internet:< URL: https://iseclab.org/papers/asiaccs122-balduzzi.pdf > pp. 136-142, ISBN: 978-1-60558-936-7.*

* cited by examiner

*Primary Examiner* — Gilberto Barron, Jr.
*Assistant Examiner* — Malcolm Cribbs
(74) *Attorney, Agent, or Firm* — ALG Intellectual Property, LLC

(57) ABSTRACT

A computer-implemented method for user-directed malware remediation may include 1) identifying a window within a graphical user interface of a computing environment, 2) identifying a user-directed interface event directed at the window, 3) determining, based at least in part on the user-directed interface event, that a process represented by the window poses a security risk, and 4) performing a remediation action on the process based on determining that the process poses the security risk. Various other methods, systems, and computer-readable media are also disclosed.

20 Claims, 6 Drawing Sheets

SYSTEMS AND METHODS FOR USER-DIRECTED MALWARE REMEDIATION

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Many security software companies attempt to combat malware by creating and deploying malware signatures (e.g., hash functions that uniquely identify malware) to their customers on a regular basis. However, a significant amount of malware has not yet been identified and therefore cannot be detected using traditional signature-based malware-detection mechanisms, particularly since malware authors may regularly modify their malware in an attempt to circumvent commonly employed signature-based malware-detection mechanisms. Furthermore, signature-based malware detection may fail to provide zero-day protection against new malware.

In addition to or as an alternative to a signature-based approach, security software companies may apply a variety heuristics to classify programs (e.g., as malware or as safe). Unfortunately, heuristic classification methods may result in false negatives, allowing malware to continue to execute. This may result in a particularly frustrating user experience when a user can visually identify a graphical user interface element tied to malware, but traditional malware systems fail to identify the malware. Accordingly, the instant disclosure identifies an addresses a need for systems and methods for user-directed malware remediation.

SUMMARY

As will be described in greater detail below, the instant disclosure generally relates to systems and methods for user-directed malware remediation by using user-directed interface events directed at windows within graphical user interfaces (e.g., windows identified by users as representing malware) to determine that the underlying processes pose security risks and perform remediation actions accordingly. In one example, a computer-implemented method for user-directed malware remediation may include 1) identifying a window within a graphical user interface of a computing environment, 2) identifying a user-directed interface event directed at the window, 3) determining, based at least in part on the user-directed interface event, that a process represented by the window poses a security risk, and 4) performing a remediation action on the process based on determining that the process poses the security risk.

The user-directed interface event may include any of a variety of events. For example, the user-directed interface event may include a pointer click event. Additionally or alternatively, the user-directed interface event may include a pointer release event. In some examples, the computer-implemented method may also include 1) identifying a prior interface event directed at the window, 2) identifying, in response to the prior interface event, an initial security assessment of the process, and 3) adding a visual enhancement to the window to indicate a result of the initial security assessment. In these examples, determining that the process represented by the window poses a security risk may include determining that the process represented by the window poses the security risk based at least in part on the initial security assessment.

In some embodiments, determining that the process represented by the window poses a security risk may include 1) determining that the process is configured to display third-party content and 2) determining that the third-party content poses the security risk. In these embodiments, performing the remediation action may include performing the remediation action on the third-party content. In some examples, determining that the process represented by the window poses a security risk may include 1) determining that the process is configured to execute a third-party script and 2) determining that the third-party script poses the security risk. In these examples, performing the remediation action may include performing the remediation action on the third-party script.

In one embodiment, a system for implementing the above-described method may include 1) an identification module programmed to identify a window within a graphical user interface of a computing environment, 2) an event module programmed to identify a user-directed interface event directed at the window, 3) a determination module programmed to determine, based at least in part on the user-directed interface event, that a process represented by the window poses a security risk, and 4) a remediation module programmed to perform a remediation action on the process based on determining that the process poses the security risk. The system may also include at least one processor configured to execute the identification module, the event module, the determination module, and the remediation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a window within a graphical user interface of a computing environment, 2) identify a user-directed interface event directed at the window, 3) determine, based at least in part on the user-directed interface event, that a process represented by the window poses a security risk, and 4) perform a remediation action on the process based on determining that the process poses the security risk.

As will be explained in greater detail below, by using user-directed interface events directed at windows within graphical user interfaces (e.g., windows identified by users as representing malware) to determine that the underlying processes pose security risks and perform remediation actions accordingly, the systems and methods described herein may leverage a user's awareness of illegitimate programs, thereby potentially improving malware identification and/or providing a user experience for anti-malware systems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
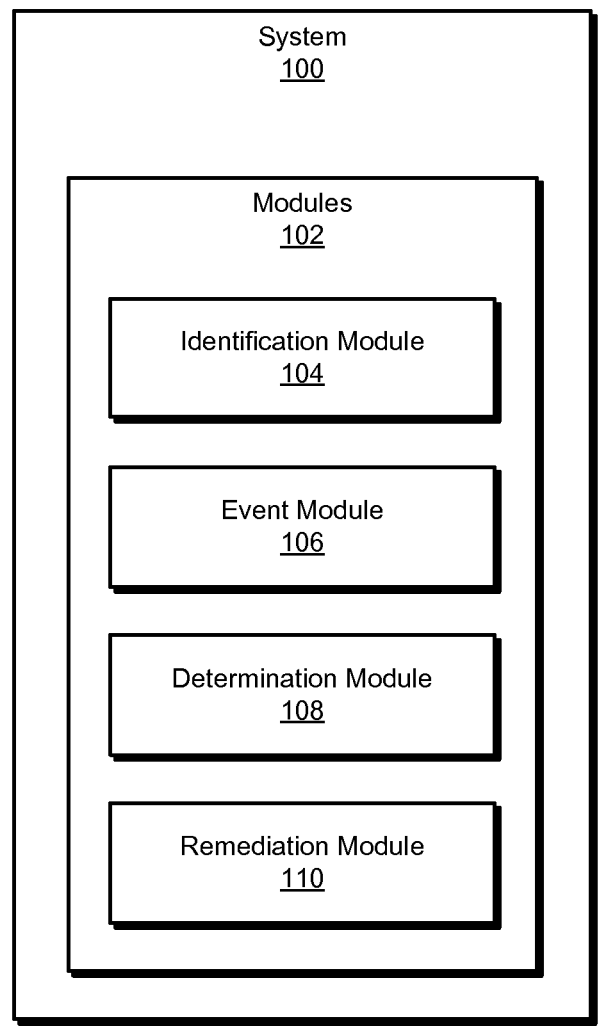
FIG. 1 is a block diagram of an exemplary system for user-directed malware remediation.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
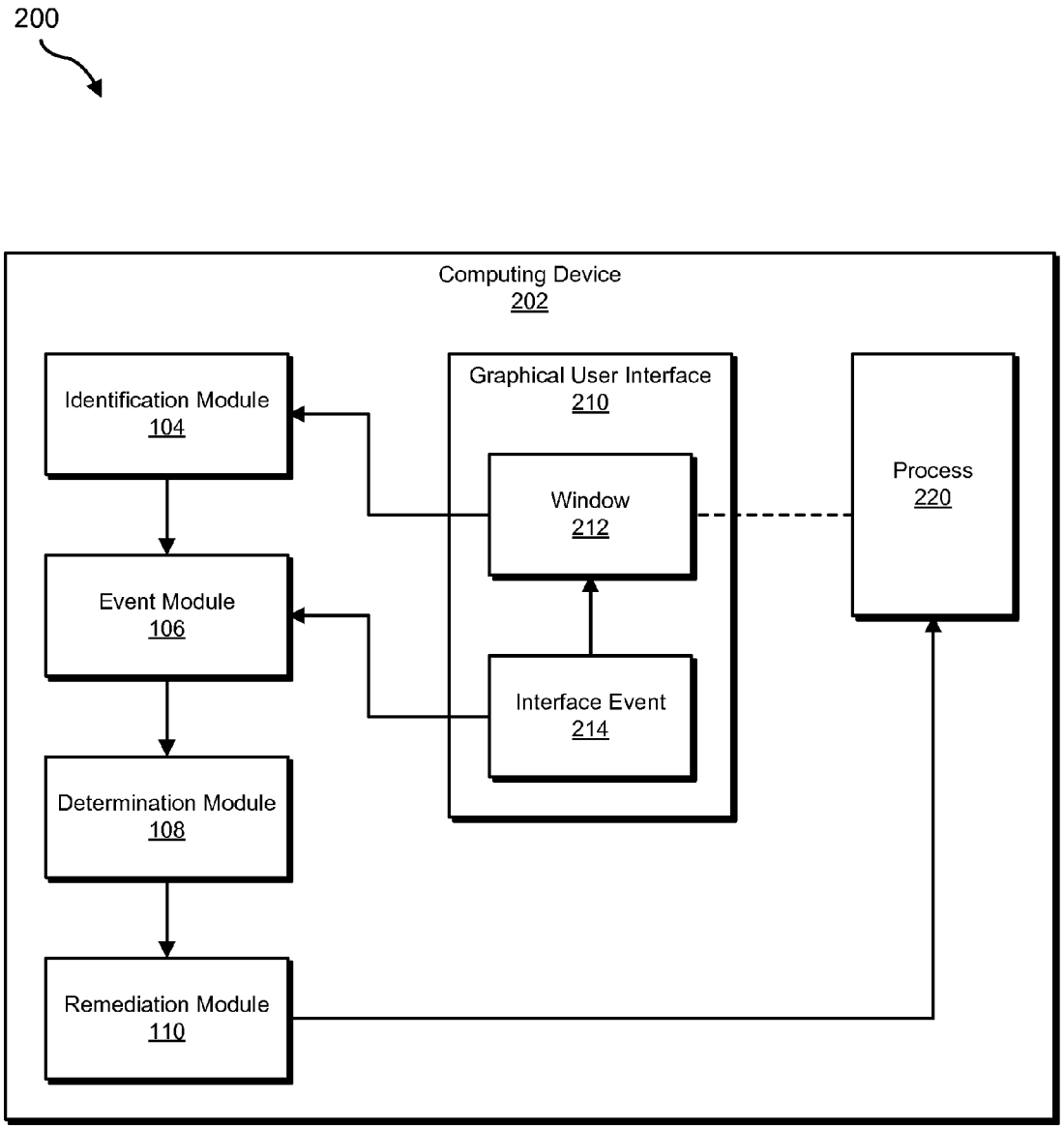
FIG. 2 is a block diagram of an exemplary system for user-directed malware remediation.

The following will provide, with reference to FIGS. 1-2, detailed descriptions of exemplary systems for user-directed malware remediation. Detailed descriptions of corresponding computer-implemented methods will also be provided in connection with FIG. 3. Detailed descriptions of an exemplary graphical user interface will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for user-directed malware remediation. As illustrated in this figure, exemplary system 100 may include one or more modules 102 for performing one or more tasks. For example, and as will be explained in greater detail below, exemplary system 100 may include an identification module 104 programmed to identify a window within a graphical user interface of a computing environment. Exemplary system 100 may also include an event module 106 programmed to identify a user-directed interface event directed at the window.

In addition, and as will be described in greater detail below, exemplary system 100 may include a determination module 108 programmed to determine, based at least in part on the user-directed interface event, that a process represented by the window poses a security risk. Exemplary system may also include a remediation module 110 programmed to perform a remediation action on the process based on determining that the process poses the security risk. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 illustrated in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 executing a malicious process 220.

In one embodiment, one or more of modules 102 from FIG. 1 may, when executed by at least one processor of computing device 202, facilitate computing device 202 in user-directed malware remediation. For example, and as will be described in greater detail below, identification module 104, event module 106, determination module 108, and/or remediation module 110 may cause computing device 202 to 1) identify a window 212 within a graphical user interface 210 of a computing environment (e.g., on computing device 202), 2) identify a user-directed interface event 214 directed at window 212, 3) determine, based at least in part on interface event 214, that process 220 represented by window 212 poses a security risk (e.g., to computing device 202), and 4) perform a remediation action on process 220 based on determining that process 220 poses the security risk.

Computing device 202 generally represents any type or form of computing device capable of reading computer-executable instructions. Examples of computing device 202 include, without limitation, laptops, tablets, desktops, servers, cellular phones, personal digital assistants (PDAs), multimedia players, embedded systems, combinations of one or more of the same, exemplary computing system 510 in FIG. 5, or any other suitable computing device.

Figure 3:
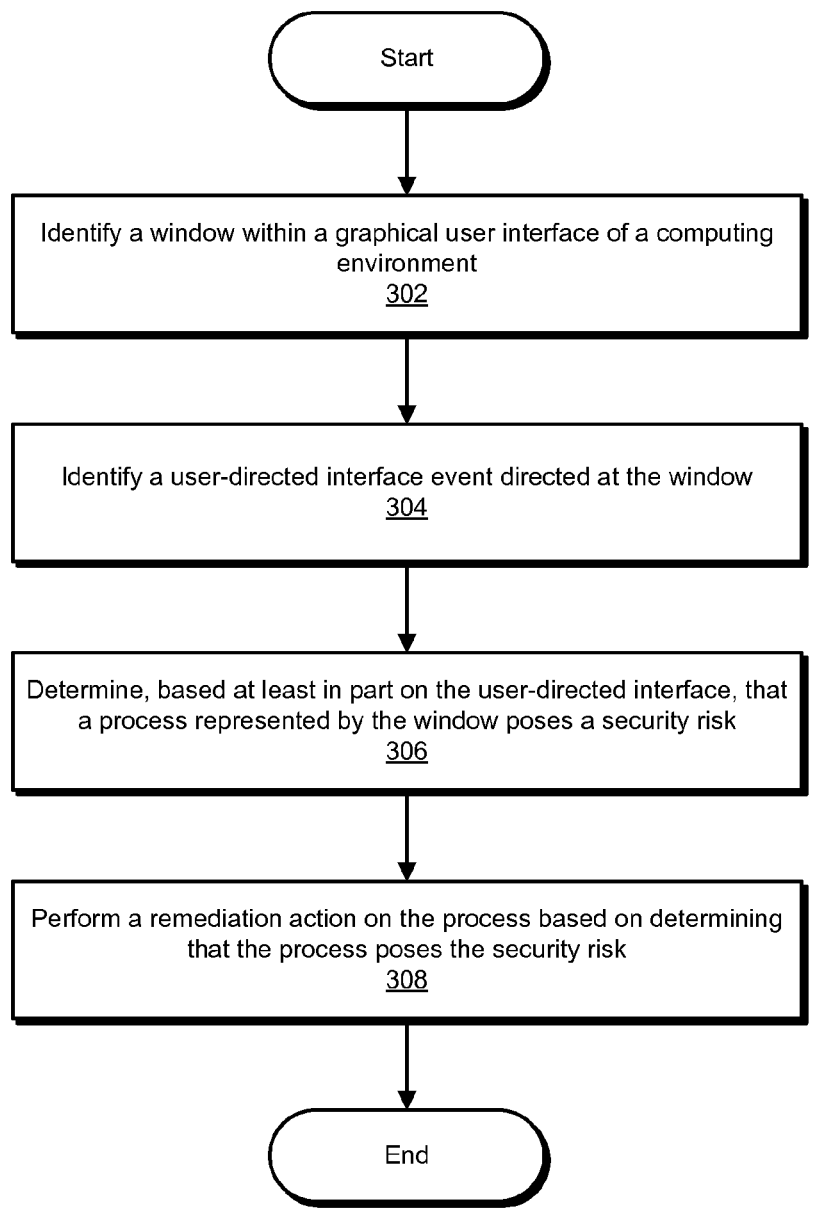
FIG. 3 is a flow diagram of an exemplary method for user-directed malware remediation.

FIG. 3 is a flow diagram of an exemplary computer-implemented method 300 for user-directed malware remediation. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a window within a graphical user interface of a computing environment. For example, at step 302 identification module 104 may, as part of computing device 202 in FIG. 2, identify window 212 within graphical user interface 210 of a computing environment (e.g., on computing device 202).

As used herein, the phrase "computing environment" may refer to any computing system and/or stateful representation of a computing system. As used herein, the phrase "graphical user interface" may refer to any interface that may allow a user to interact with a computing system. For example, the graphical user interface may include a window manager and/or a desktop environment. Generally, the graphical user interface may include any interface capable of visually representing one or more processes and/or applications.

As used herein, the term "window" may refer to any area providing an interface for one or more processes and/or representing one or more processes. For example, the term "window" may refer to an input area and/or an output area for one or more processes. Examples of windows may include windows, frames, panes, tabs, and/or any other dynamic and/or static area for representing one or more processes.

Identification module 104 may identify the window in any suitable manner. For example, as will be described in greater detail below, one or more of the systems described herein may identify a user-directed event directed at the window. Accordingly, identification module 104 may identify the window by identifying the user-directed event directed at the window. In some examples, identification module 104 may identify the window by identifying an identifier of the window used within the graphical user interface.

Figure 4:
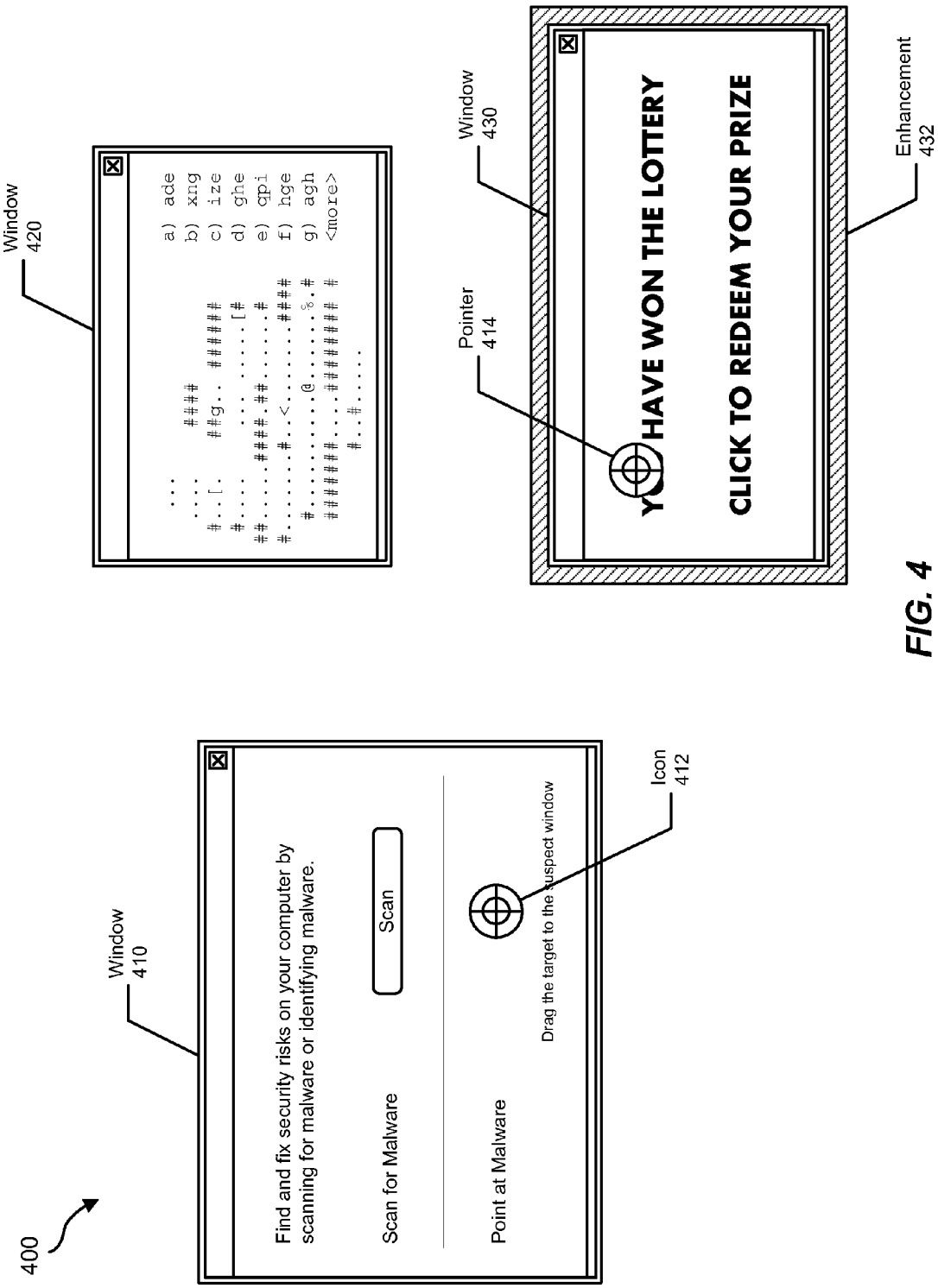
FIG. 4 is a diagram of an exemplary graphical user interface for user-directed malware remediation.

FIG. 4 illustrates an exemplary graphical user interface 400. As shown in FIG. 4, exemplary graphical user interface 400 may include a window 410, a window 420, and a window 430. Using FIG. 4 as an example, at step 302 identification module 104 may identify window 430 within graphical user interface 400.

Returning to FIG. 3, at step 304 one or more of the systems described herein may identify a user-directed interface event directed at the window. For example, at step 304 event module 106 may, as part of computing device 202 in FIG. 2, identify user-directed interface event 214 directed at window 212.

As used herein, the phrase "interface event" may refer to any event within a graphical user interface. Accordingly, the phrase "user-directed interface event" may refer to any interface event initiated via one or more input devices configured to provide input via the graphical user interface. In one example, the user-directed interface event may include a pointer click event. For example, event module 106 may determine that a user clicked on the window (e.g., with a mouse pointing device). In another example, the user-directed interface event may include a pointer release event (e.g., with a mouse pointing device). For example, event module 106 may determine that a user released a button on a pointing device while a pointer (e.g., a mouse pointer, a cursor, etc.) was over and/or within the window. In at least one example, the user-directed interface event may include a drag-and-release event. For example, event module 106 may determine that a click event of a pointing device occurred on a predetermined interface element (e.g., an icon to drag to a suspect window) and that a subsequent release event occurred when a pointer of the pointing device was over and/or within the window (e.g., "dropping" the icon on the window). In some additional examples, the user-directed interface event may include a gesture input event directed at the window, a key press, and key release, and/or a key chord performed with the window in focus, and/or any other suitable input event.

Using FIG. 4 as an example, window 410 may include an icon 412 for dragging-and-releasing to a suspect window. In one example, a user may click on icon 412, move a pointer 414 (e.g., represented as icon 412 during the drag-and-release process) to window 430, and then release icon 412 while pointer 414 is over window 430. In this example, event module 106 may identify the release event over window 430 and/or the click event on icon 412.

In some examples, one or more systems described herein may also visually enhance the window (e.g., to provide more information to a user to facilitate a user determination of whether the window represents a security risk). For example, event module 106 may 1) identify a prior interface event directed at the window, 2) identify, in response to the prior interface event, an initial security assessment of a process represented by the window, and 3) add a visual enhancement to the window to indicate a result of the initial security assessment.

The prior interface event may include any suitable interface event. For example, the prior interface event may include a hover event (e.g., a pointer hovering over the window). Additionally or alternatively, the prior interface event may include a focus event (e.g., the window moving to the front of a multiple-window environment, the window being designated to receive input in a multiple-window environment, etc.).

The initial security assessment may include any of a variety of security assessment techniques. For example, the initial security assessment may include checking an application against a whitelist. Additionally or alternatively, the initial security assessment may include identifying a reputation of the application. The term "reputation" as used herein, generally refers to information that conveys the opinion of a specific community (such as the user base of a security-software publisher) on the trustworthiness or legitimacy of an executable file, software publisher, and/or file source (such as a web domain or download link). Examples of reputation information include, without limitation, reputation scores (where, for example, high reputation scores indicate that a file, software publisher, or file source is generally trusted within a community and low reputation scores indicate that a file, software publisher, or file source is generally untrusted within a community), prevalence information (e.g., information that identifies the number or percentage of user devices within a community that contain 1) an instance of a particular file, 2) files provided by a particular software publisher, and/or 3) files obtained from a particular file source, such as a web domain), or any other information that may be used to identify a community's opinion on the trustworthiness or legitimacy of a file, software publisher, and/or file source. The initial security assessment may, additionally or alternatively, include any other security assessment technique, including one or more heuristics for identifying malware.

The visual enhancement may include any of a variety of enhancements. For example, the visual enhancement may include a colored border indicating whether or not the window represents a trusted application (e.g., a green border for a trusted application and a red border for a non-trusted application), a colored tinting and/or overlay indicating whether the window represents a trusted application, an icon and/or watermark displayed on the window, hover text over the window, and/or any other suitable enhancement for conveying information about the initial security assessment to a user. As will be explained in greater detail below, in some examples, one or more of the systems described herein may further use the initial security assessment in determining a disposition of a process and/or application underlying the window. Using FIG. 4 as an example, event module 106 may add an enhancement 432 to window 430 (e.g., a red border around window 430, indicating that the underlying application is not on a whitelist of trusted applications) in response to pointer 414 hovering over window 430.

Event module 106 may identify the user-directed interface event in any suitable manner. For example, event module 106 may include at least a portion of a hook in an event handler of the graphical user interface and intercept the user-directed interface event. Additionally or alternatively, event module 106 may receive a message from an event handler of the graphical user interface.

Returning to FIG. 3, at step 306 one or more of the systems described herein may determine, based at least in part on the user-directed interface event, that a process represented by the window poses a security risk. For example, at step 306 determination module 108 may, as part of computing device 202 in FIG. 2, determine, based at least in part on interface event 214, that process 220 represented by window 212 poses a security risk (e.g., to computing device 202).

As used herein, the term "process" may refer to any program in execution (e.g., an instantiation and/or running copy of a program expressed by an executable file). In some examples, the process may include multiple processes, threads, and/or subprocesses. Additionally or alternatively, as used herein, the term "process" may refer to an executable file and/or an application.

As used herein, the phrase "security risk" may refer to any potential undesired effect caused by an illegitimate, malicious, and/or exploited process. For example, determination module 108 may determine that the process includes malware. As used herein, the term "malware" may refer to any virus, worm, Trojan horse, spyware, and/or any other malicious, illegitimate, and/or unauthorized software.

Determination module 108 may determine that the process represented by the window poses a security risk in any suitable manner. For example, determination module 108 may simply interpret the user-directed interface event, in the context in which the user-directed interface event occurred, as an instruction to treat the process as a security risk. In some examples, determination module 108 may also incorporate other information and/or assessments to determine whether the process poses a security risk. For example, as mentioned earlier, event module 106 may perform an initial security assessment on the process (e.g., in order to visually enhance the window according to the results of the initial security assessment). In this example, determination module 108 may use the results of the initial security assessment in addition to the user-directed interface event to determine that the process poses a security risk. Additionally or alternatively, determination module 108 may perform a scan of and/or identify the results of one or more additional security assessments of the process to contribute to the determination. For example, determination module 108 may identify a reputation of the process, identify a behavioral analysis of the process, and/or identify and/or perform any other suitable security risk analysis.

In some examples, determination module 108 may determine that the process represents a legitimate application but that the application has loaded content, a script, and/or another data object that poses the security risk. For example, determination module 108 may determine that the process is configured to display third-party content (e.g., determination module 108 may determine that the process represents a web browser configured to display web pages provided by third parties). As used herein, the phrase "third-party content" as applied to a process may refer to any content not native to the process but retrieved, displayed, and/or used by the process from a third-party source. Accordingly, determination module 108 may determine that the third-party content poses the security risk (e.g., that a web page displayed by the process includes a phishing attempt, a link to malware, etc.). As will be explained in greater detail below, in some examples one or more of the systems described herein may perform a remediation action on the third-party content in addition to and/or instead of on the process.

Likewise, determination module 108 may determine that the process is configured to execute a third-party script (e.g., determination module 108 may determine that the process represents a web browser configured to execute a script provided by third parties). As used herein, the phrase "third-party script" as applied to a process may refer to any script not native to the process, but retrieved, loaded, and/or executed by the process from a third-party source. Accordingly, determination module 108 may determine that the third-party script poses the security risk (e.g., that a script executed by the process includes malware). As will be explained in greater detail below, in some examples one or more of the systems described herein may perform a remediation action on the third-party script in addition to and/or instead of on the process.

Using FIG. 4 as an example, at step 306 determination module 108 may determine, based at least in part on the user-directed interface event (e.g., releasing a pointing device button when pointer 414 is over window 430), that a process represented by window 430 poses a security risk.

Returning to FIG. 3, at step 308 one or more of the systems described herein may perform a remediation action on the process based on determining that the process poses the security risk. For example, at step 308 remediation module 110 may, as part of computing device 202 in FIG. 2, perform a remediation action on process 220 based on determining that process 220 poses the security risk.

The remediation action may include any of a variety of actions for preventing, reducing, warning about, gathering information about, and/or otherwise addressing a security risk. For example, the remediation action may include terminating the process, identifying an executable file from which the process spawned, and deleting the executable file. Additionally or alternatively, the remediation action may include removing a load point for the process (e.g., a configuration and/or program responsible for initiating the process). Additional examples of steps taken by the remediation action may include quarantining an executable file backing the process, warning a user, an administrator, and/or a security vendor about the process, performing a security scan of the process and/or one or more files related to and/or used by the process, undoing system changes performed by the process, and the like. Generally, the remediation action may include any action that may be performed on a suspect and/or illegitimate process.

As mentioned earlier, in some examples determination module 108 may determine that third-party content displayed by the process poses the security risk. In these examples, remediation module 110 may perform the remediation action on the third-party content. For example, remediation module 110 may remove the third-party content from the computing system (e.g., by closing a web page), block the source of the third-party content, and/or report the source of the third-party content to a security vendor. In some examples, third-party content may include benign content that is alarming and/or suspicious to a user. For example, third-party content may include an Internet advertisement simulating malware and/or simulating a legitimate security warning about malware. In these examples, remediation module 110 may inform the user that the Internet advertisement does not include actual malware and/or a legitimate security warning (and, e.g., block the Internet advertisement, report the Internet advertisement, etc.).

Likewise, as mentioned earlier, in some examples determination module 108 may determine that a third-party script displayed by the process poses the security risk. In these examples, remediation module 110 may perform the remediation action on the third-party script. For example, remediation module 110 may stop execution of the third-party script, close a web page that carried the third-party script, block the source of the third-party script, and/or report the script and/or the source of the third-party script to a security vendor.

Using FIG. 4 as an example, at step 308 remediation module 110 may perform a remediation action on the process underlying window 430. For example, remediation module 110 may close window 430, terminate the process, delete one or more executable files responsible for the process, undo one or more system changes performed by the process, and/or perform any other suitable remediation action.

As explained above, by using user-directed interface events directed at windows within graphical user interfaces (e.g., windows identified by users as representing malware) to determine that the underlying processes pose security risks and perform remediation actions accordingly, the systems and methods described herein may leverage a user's awareness of illegitimate programs, thereby potentially improving malware identification and/or providing a user experience for anti-malware systems.

Figure 5:
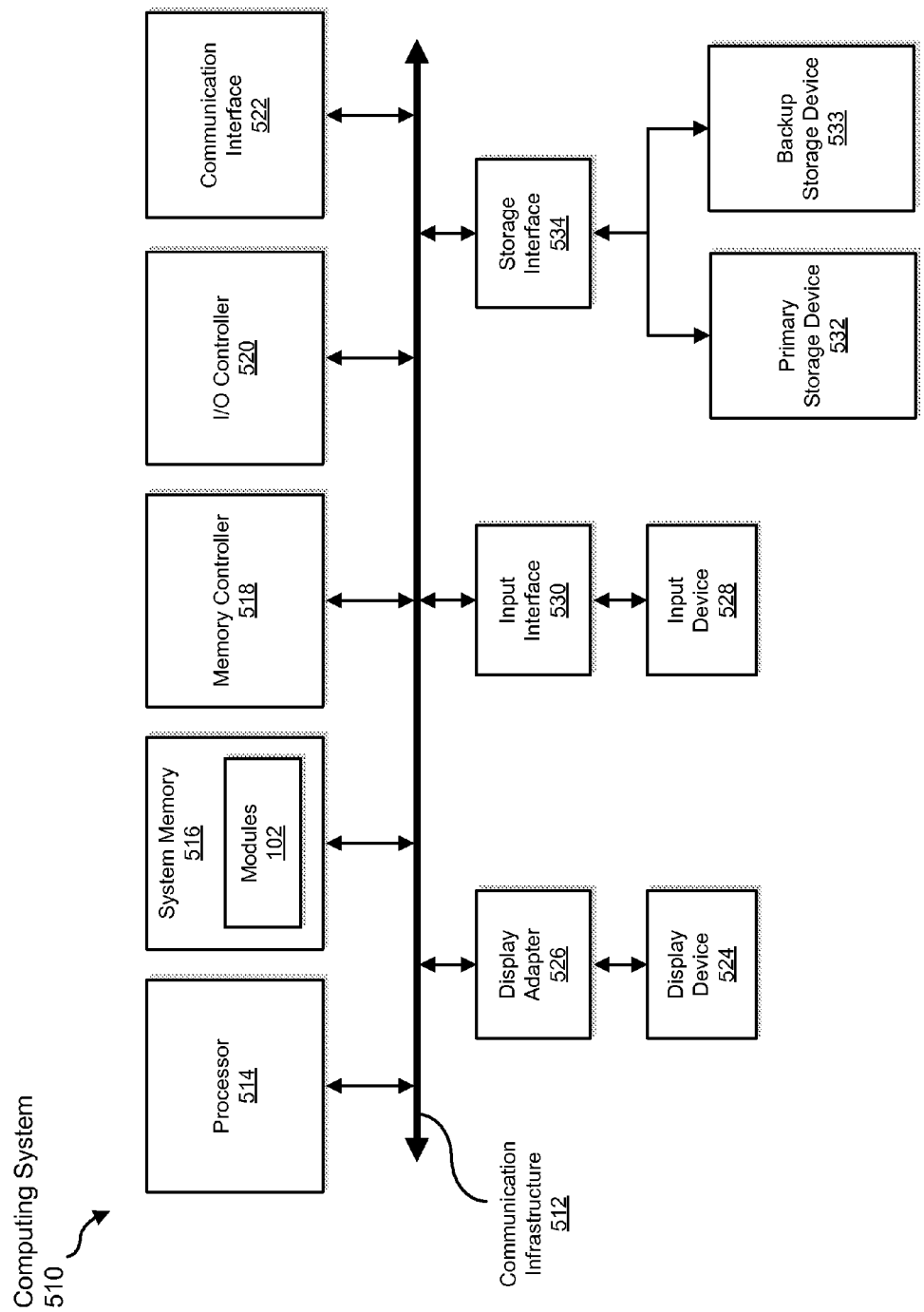
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, adding, determining, performing, terminating, deleting, and performing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
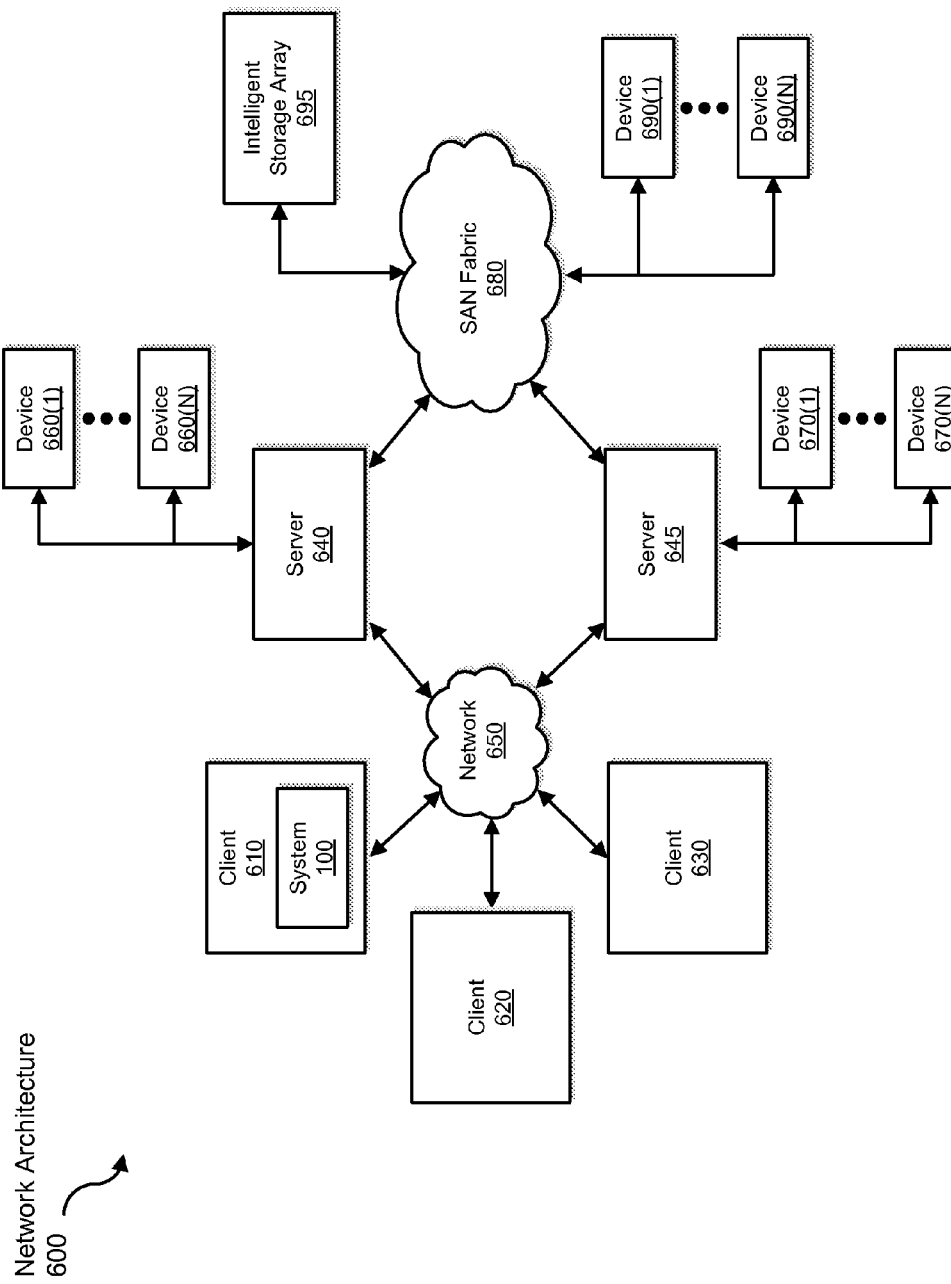
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, adding, determining, performing, terminating, deleting, and performing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for user-directed malware remediation.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for performing user-directed malware remediation.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for user-directed malware remediation, at least a portion of the method being performed by a computing device comprising at least one processor, the method comprising:

identifying an application window within a graphical user interface of a computing environment;

identifying an initial security assessment that is based on a reputation of an application process that is represented by the application window;

adding a visual enhancement to the application window that indicates a result of the initial security assessment;

identifying a user-directed interface event that indicates that a user is identifying the application window as representing malware;

determining, based at least in part on the user-directed interface event, that the application process that is represented by the application window and that is operating within the computing environment poses a security risk to the computing environment;

performing a remediation action on the application process based on determining that the application process poses the security risk to the computing environment.

2. The computer-implemented method of claim 1, wherein the user-directed interface event comprises at least one of:

a pointer click event;

a pointer release event.

3. The computer-implemented method of claim 1, wherein determining that the application process represented by the application window poses the security risk to the computing environment comprises:

determining that the application process is configured to display third-party content within the application window;

determining that the third-party content poses the security risk.

4. The computer-implemented method of claim 3, wherein performing the remediation action on the application process comprises performing the remediation action on the third-party content.

5. The computer-implemented method of claim 1, wherein determining that the application process represented by the application window poses the security risk to the computing environment comprises:

determining that the application process is configured to execute a third-party script;

determining that the third-party script poses the security risk.

6. The computer-implemented method of claim 5, wherein performing the remediation action on the application process comprises performing the remediation action on the third-party script.

7. The computer-implemented method of claim 1, further comprising identifying a prior interface event that was directed at the application window and that triggered the initial security assessment.

8. The computer-implemented method of claim 1, wherein the visual enhancement comprises at least one of:

a colored border on the application window;
a colored tinting of the application window;
an icon displayed within the application window;
text within the application window;
a highlighting of the application window;
an overlay over the application window.

9. The computer-implemented method of claim 1, wherein performing the remediation action on the application process comprises:
   terminating the application process;
   identifying an executable file from which the application process spawned;
   deleting the executable file.

10. A system for user-directed malware remediation, the system comprising:
   an identification module programmed to identify an application window within a graphical user interface of a computing environment;
   an enhancement module programmed to:
      identify an initial security assessment that is based on a reputation of an application process that is represented by the application window;
      add a visual enhancement to the application window that indicates a result of the initial security assessment;
   an event module programmed to identify a user-directed interface event that indicates that a user is identifying the application window as representing malware;
   a determination module programmed to determine, based at least in part on the user-directed interface event, that an application process that is represented by the application window and that is operating within the computing environment poses a security risk to the computing environment;
   a remediation module programmed to perform a remediation action on the application process based on determining that the application process poses the security risk to the computing environment;
   at least one processor configured to execute the identification module, the reputation module, the enhancement module, the event module, the determination module, and the remediation module.

11. The system of claim 10, wherein the application process comprises a legitimate process that has loaded content that comprises the security risk.

12. The system of claim 10, wherein the determination module is programmed to determine that the application process represented by the application window poses the security risk to the computing environment by:
   determining that the application process is configured to display third-party content;
   determining that the third-party content poses the security risk.

13. The system of claim 12, wherein the remediation module is programmed to perform the remediation action on the application process by performing the remediation action on the third-party content.

14. The system of claim 10, wherein the determination module is programmed to determine that the application process represented by the application window poses the security risk to the computing environment by:
   determining that the application process is configured to execute a third-party script;
   determining that the third-party script poses the security risk.

15. The system of claim 14, wherein the remediation module is programmed to perform the remediation action on the application process by performing the remediation action on the third-party script.

16. The system of claim 10, wherein the enhancement module is programmed to a prior interface event that was directed at the application window and that triggered the initial security assessment.

17. The system of claim 10, wherein the determination module is programmed to determine that the application process represented by the application window poses the security risk to a computing system by determining that the application process represented by the application window poses the security risk based at least in part on the initial security assessment.

18. The system of claim 10, wherein the initial security assessment comprises at least one of:
   checking the application process against a trusted application whitelist;
   determining the reputation of the application process;
   analyzing the application process with a malware-detection heuristic.

19. A non-transitory computer-readable-storage medium comprising one or more computer-executable instructions that, when executed by at least one processor of a computing device, cause the computing device to:
   identify an application window within a graphical user interface of a computing environment;
   identify an initial security assessment that is based on a reputation of an application process that is represented by the application window;
   add a visual enhancement to the application window that indicates a result of the initial security assessment;
   identify a user-directed interface event that indicates that a user is identifying the application window as representing malware;
   determine, based at least in part on the user-directed interface event, that an application process that is represented by the application window and that is operating within the computing environment poses a security risk to the computing environment;
   perform a remediation action on the application process based on determining that the application process poses the security risk to the computing environment.

20. The non-transitory computer-readable-storage medium of claim 19, wherein the user-directed interface event comprises at least one of:
   a pointer click event;
   a pointer release event.

* * * * *